(No Model.)

DE WITT C. WALLACE.
COOKING STOVE.

No. 553,274. Patented Jan. 21, 1896.

Witnesses
W. J. Koerth
V. B. Hillyard

Inventor
DeWitt C. Wallace
By his Attorneys,
C. A. Snow & Co.

UNITED STATES PATENT OFFICE.

DEWITT CLINTON WALLACE, OF PADUCAH, KENTUCKY, ASSIGNOR OF ONE-HALF TO EDWARD KIRBY BONDS, OF SAME PLACE.

COOKING-STOVE.

SPECIFICATION forming part of Letters Patent No. 553,274, dated January 21, 1896.

Application filed April 30, 1895. Serial No. 547,672. (No model.)

*To all whom it may concern:*

Be it known that I, DEWITT CLINTON WALLACE, a citizen of the United States, residing at Paducah, in the county of McCracken and State of Kentucky, have invented a new and useful Cooking-Stove, of which the following is a specification.

This invention aims to produce an improved cooking-stove in which the heat is utilized to the best possible advantage for heating the oven and for cooking purposes generally, and which will present an extended top for the reception of cooking utensils and operate with less fuel than is possible with similar prior stoves having a top surface of like extent and an oven of equal capacity.

With these ends in view the invention consists, mainly, of a stove having the oven at one end, the fire-box at the opposite end and an intermediate space between the oven and the fire-box which is divided by a diagonally-disposed partition or plate, which inclines downwardly and rearwardly from the fire-box to give proper direction to the current of heated air, the space between the said partition or plate and the adjacent wall of the fire-box being utilized as a warming-oven, and a damper to be operated to cause the heated air to pass entirely around the oven or direct to the smoke-pipe, the latter being located between the ends of the stove and directly above the front end of the oven.

The improvement also consists of the novel features and the peculiar construction and combination of the parts which hereinafter will be more fully set forth and claimed, and which are illustrated in the accompanying drawings, in which—

Figure 1:
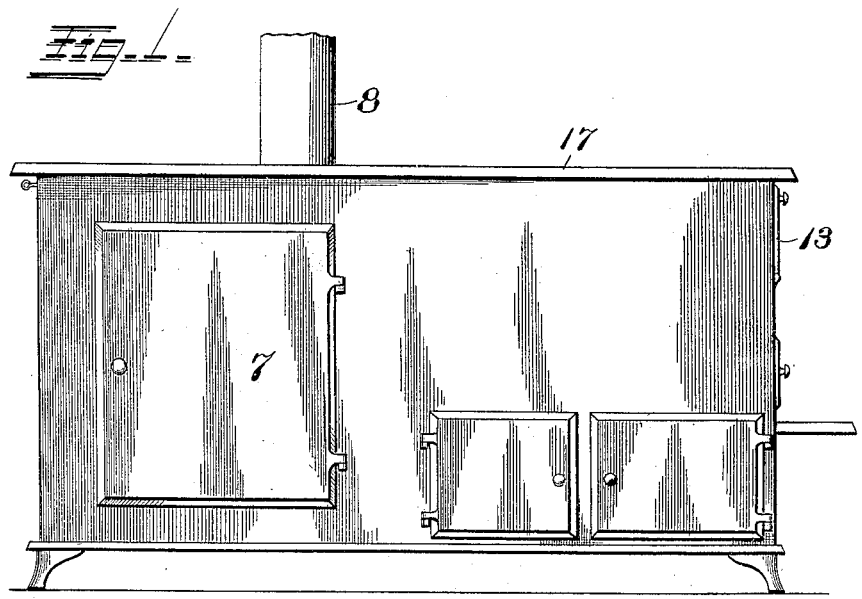
Figure 2:
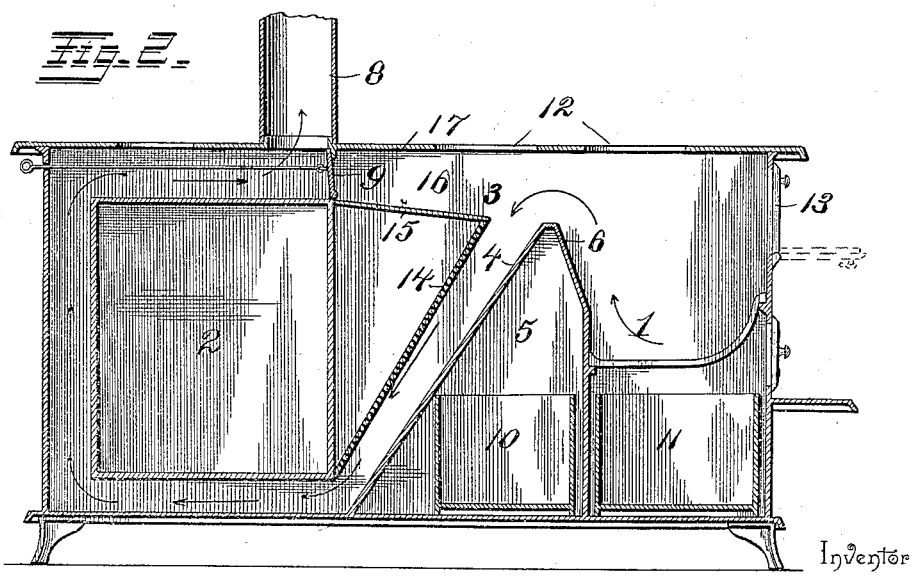

Figure 1 is a side elevation of a cooking stove embodying the essence of the invention. Fig. 2 is a vertical longitudinal section thereof.

The cooking stove or range may be of any desired pattern and is provided at its front end with a fire-box 1, at the rear or opposite end with an oven 2, and with a space 3 intermediate of the oven and the fire-box, and divided by a partition or plate 4 so as to inclose a space 5 between the said plate and the vertical wall 6 of the fire-box. The oven 2 has an unobstructed passage around its four sides for the free circulation of the heated air, and is closed at its open end by a door 7 in the usual manner. The smoke-pipe 8 is placed between the ends of the stove and directly above the front end of the oven, and a damper 9 is disposed to close the space between the top of the oven and the top of the stove, thereby shutting off the direct draft and compelling the heat to circulate completely around the oven before escaping to the smoke-pipe, thereby heating the oven for purposes of baking or cooking.

The partition or plate 4 extends diagonally and inclines rearwardly and downwardly from the top edge of the inner wall 6 of the fire-box, thereby occurring in a position corresponding with the natural draft in its passage from the fire-box to the lower side of the oven. A warming-oven 10 is located in the space 5 formed between the plate 4 and the wall 6, and may be a removable box or drawer or a permanent part of the stove which is accessible through an opening in the side of the stove closed by a suitable door. The ash-pit beneath the fire-box is supplied with an ash-pan 11 for the well-known purpose. This ash-pan is removable through the side of the stove. The stove-top has the ordinary openings 12, in which are placed the utensils in which the food is cooked. A blower 13 is located in the front of the stove to control the draft and admit of ready access to the fire-box for poking the fire.

From the foregoing it will be seen that the component parts are disposed in a compact manner so as to utilize the maximum amount of heat for performing efficient work from a given amount of fuel. The heat radiated from the plate 4 and from the fire-box serves the purpose of warming the space 5, in which is placed the food or other articles to be kept heated. When starting the fire the damper 9 is turned down to establish a direct communication between the fire-box and the smoke-pipe, and after the fire has become sufficiently burned and it is required to use the oven the damper 9 is thrown up, thereby causing the heat to pass entirely around the oven and heat the latter, as will be readily understood.

In order to protect the front side of the oven from the direct blast and secure a more uniform distribution of the heat as well as a direct draft it has been found necessary to provide a diaphragm 14 and locate the same in the space 3 approximately parallel with the plate 4, and this diaphragm is perforated to prevent a dead-air space occurring between it and the front side of the oven, and extends from the lower front corner of the oven upwardly and forwardly and terminating about in the plane of a line connecting the top of the oven and the top edge of the plate 4. A plate 15 extends from the upper front corner of the oven and connects with the top edge of the diaphragm 14, and this plate inclines slightly from the horizontal so that the space 16 formed between it and the stove-top 17 is larger at the end adjacent to the fire-box and gradually narrows toward the damper 9. The passage formed between the plate 4 and the perforated diaphragm 14 is slightly wider at its upper end and gradually contracts as it approaches the space beneath the oven. By means of the construction just described the hot air and products of combustion have a direct passage either to the smoke-pipe 8 or around the oven 2 and eddying currents are prevented in the space adjacent to the front side of the oven.

Inasmuch as the patterns of cooking-stoves are many and vary according to the design of the constructer, it must be remembered that in adapting the invention to the various styles and makes of stoves changes in the form, proportion, and the minor details of construction may be resorted to without departing from the principle or sacrificing any of the advantages of this invention.

Having thus described the invention, what is claimed as new is—

A cooking stove or range having a medial hot-air space, an oven at one end, and a fire-box at the opposite end, all in substantially the same horizontal plane, a diagonally-disposed plate 4 connecting the top of the rear fire-box wall with the bottom plate of the stove and forming a warming oven in the angular space inclosed between the said plate 4 and the adjacent fire-box wall, a plate 15 extending into the said medial space from the upper end of the oven wall adjacent to the fire-box, a perforated diaphragm 14 extending approximately parallel with the plate 4 and connecting the free end of the plate 15 with the lower corner of the oven contiguous to the plate 4, and a damper at the inner end of the plate 15 for controlling the heated air, substantially as and for the purpose set forth.

In testimony that I claim the foregoing as my own I have hereto affixed my signature in the presence of two witnesses.

DEWITT CLINTON WALLACE.

Witnesses:
S. S. EAKER,
N. W. SPARKS.